US010903942B2

(12) United States Patent
Nam et al.

(10) Patent No.: US 10,903,942 B2
(45) Date of Patent: Jan. 26, 2021

(54) SYNCHRONIZATION SIGNAL BLOCK AND DOWNLINK CHANNEL MULTIPLEXING

(71) Applicant: QUALCOMM Incorporated, San Diego, CA (US)

(72) Inventors: Wooseok Nam, San Diego, CA (US); Tao Luo, San Diego, CA (US); Wanshi Chen, San Diego, CA (US); Heechoon Lee, San Diego, CA (US); Peter Gaal, San Diego, CA (US); Alexandros Manolakos, San Diego, CA (US); Valentin Gheorghiu, Koto-ku (JP)

(73) Assignee: QUALCOMM Incorporated, San Diego, CA (US)

( * ) Notice: Subject to any disclaimer, the term of this patent is extended or adjusted under 35 U.S.C. 154(b) by 72 days.

(21) Appl. No.: 16/277,841

(22) Filed: Feb. 15, 2019

(65) Prior Publication Data

US 2019/0319748 A1 Oct. 17, 2019

(30) Foreign Application Priority Data

Apr. 16, 2018 (GR) .............................. 20180100161

(51) Int. Cl.
| | |
|---|---|
| *H04L 1/16* | (2006.01) |
| *H04L 27/26* | (2006.01) |
| *H04W 8/24* | (2009.01) |
| *H04B 7/0413* | (2017.01) |
| *H04W 72/06* | (2009.01) |
| *H04W 72/12* | (2009.01) |
| *H04W 72/04* | (2009.01) |

(52) U.S. Cl.
CPC ......... *H04L 1/1657* (2013.01); *H04B 7/0413* (2013.01); *H04L 27/2665* (2013.01); *H04W 8/24* (2013.01); *H04W 72/048* (2013.01); *H04W 72/06* (2013.01); *H04W 72/1242* (2013.01)

(58) Field of Classification Search
CPC . H04L 1/1657; H04L 27/2665; H04B 7/0413; H04W 8/24
See application file for complete search history.

(56) References Cited

U.S. PATENT DOCUMENTS

2017/0331610 A1\* 11/2017 Miao ................. H04W 72/0453
2018/0324678 A1\* 11/2018 Chen ....................... H04W 8/08

OTHER PUBLICATIONS

International Search Report and Written Opinion—PCT/US2019/027526—ISA/EPO—dated Jun. 27, 2019.

(Continued)

*Primary Examiner* — Siming Liu
(74) *Attorney, Agent, or Firm* — Harrity & Harrity, LLP

(57) ABSTRACT

Techniques and apparatuses described herein permit selective multiplexing of synchronization signal blocks (SSBs), inside of or outside of an SSB measurement timing configuration (SMTC) window, and downlink channel communications depending on one or more factors, which may increase spectral efficiency due to multiplexing when permitted, and may prevent or reduce collisions and interference when not permitted (e.g., due to quasi co-location constraints, processing constraints, timeline constraints, and/or the like).

30 Claims, 12 Drawing Sheets

(56) References Cited

OTHER PUBLICATIONS

Nokia, et al: "On Channels Multiplexing", 3GPP Draft; R1-1805107, 3rd Generation Partnership Project (3GPP), Mobile Competence Centre; 650, Route Des Lucioles; F-06921 Sophia-Antipolis Cedex; France, vol. RAN WG1, No. Sanya, P.R. China; Apr. 16, 2018-Apr. 20, 2018, Apr. 15, 2018, XP051427366, 4 pages, Retrieved from the Internet: URL: http://www.3gpp.org/ftp/Meetings%5F3GPP% 5FSYNC/RAN1/Docs/ [retrieved on Apr. 15, 2018] p. 1, lines 17-28 p. 3, line 3.

Nokia et al: "On Channels Multiplexing", 3GPP Draft; R1-1807188, 3rd Generation Partnership Project (3GPP), Mobile Competence Centre; 650, Route Des Lucioles; F-06921 Sophia-Antipolis Cedex; France, vol. RAN WG1, No. Busan, Korea; May 21, 2018-May 25, 2018, May 20, 2018, XP051442385, 6 pages, Retrieved from the Internet: URL: http://www.3gpp.org/ftp/Meetings%5F3GPP% 5FSYNC/RAN1/Docs/ [retrieved on May 20, 2018] the whole document.

Qualcomm Incorporated: "Remaining System Information Delivery Consideration," 3GPP Draft; R1-1804776 Remaining System Information Delivery Consideration, 3rd Generation Partnership Project (3GPP), Mobile Competence Centre; 650, Route Des Lucioles; F-06921 Sophia-Antipolis Cedex, vol. RAN WG1, No. Sanya, China; Apr. 16, 2018-Apr. 20, 2018, Apr. 15, 2018, XP051427043, 6 Pages, Retrieved from the Internet: URL: http://www.3gpp.org/ ftp/Meetings%5F3GPP%5FSYNC/RAN1/Docs/ [retrieved on Apr. 15, 2018] the whole document.

Samsung: "Corrections on Paging Design", 3GPP Draft; R1-1800416 Paging, 3rd Generation Partnership Project (3GPP), Mobile Competence Centre; 650, Route Des Lucioles; F-06921 Sophia-Antipolis Cedex; France, vol. RAN WG1, No. Vancouver, Canada; Jan. 22, 2018-Jan. 26, 2018, Jan. 12, 2018, XP051384327, 4 Pages, Retrieved from the Internet: URL: http://www.3gpp.org/ftp/tsg% 5Fran/WG1%5FRL1/TSGR1%5FAH/NR%5FAH%5F1801/Docs/ [retrieved on Jan. 12, 2018] the whole document.

* cited by examiner

SYNCHRONIZATION SIGNAL BLOCK AND DOWNLINK CHANNEL MULTIPLEXING

CROSS-REFERENCE TO RELATED APPLICATIONS UNDER 35 U.S.C. § 119

This application claims priority to Greek Patent Application No. 20180100161, filed on Apr. 16, 2018, entitled "TECHNIQUES AND APPARATUSES FOR SYNCHRONIZATION SIGNAL BLOCK AND DOWNLINK DATA CHANNEL MULTIPLEXING," which is hereby expressly incorporated by reference herein.

BACKGROUND

Field

Aspects of the present disclosure generally relate to wireless communication, and more particularly to techniques and apparatuses for synchronization signal block (SSB) and downlink channel multiplexing.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some aspects, a UE may measure one or more synchronization signal blocks (SSBs) in connection with radio resource management. For example, the UE may measure SSBs of one or more neighbor cells to assist with cell search, cell selection, cell reselection, handover, and/or the like. For radio resource management, a UE may be configured with an SSB measurement timing configuration (SMTC) window, and a base station may indicate a set of SSBs, within the SMTC window, to be measured by the UE for radio resource management. Alternatively, if the base station does not indicate the set of SSBs to be measured in the SMTC window, then the UE may measure all SSBs within the SMTC window (e.g., according to a preconfigured SSB pattern).

Within an SMTC window, the base station may prevent downlink channel communications (e.g., PDSCH communications, PDCCH communications, and/or the like) from being scheduled or transmitted in any symbol in which the UE is configured to measure an SSB, and may further prevent downlink channel communications from being scheduled or transmitted one symbol before and one symbol after the SSB. However, in some cases, a UE may measure one or more SSBs outside of the SMTC window, such as in connection with radio link monitoring. Unlike SSB measurements in the SMTC window, which involve measuring neighbor base station SSBs that may be difficult to multiplex, SSB measurements outside of the SMTC window may be performed on serving base station SSBs, which may be multiplexed with other information, such as downlink channel communications (e.g., PDSCH communications). For example, the serving base station may store information regarding the serving cell SSBs and/or the UEs connected to the serving base station that permit such multiplexing to occur in some situations. Techniques and apparatuses described herein permit selective multiplexing of SSBs outside of an SMTC window with PDSCH communications (also referred to herein as downlink data channel communications) depending on one or more factors, which may increase spectral efficiency due to multiplexing when permitted, and may prevent or reduce collisions and interference when not permitted (e.g., due to quasi co-location constraints, processing constraints, timeline constraints, and/or the like). Additionally, or alternatively, some techniques and apparatuses described herein permit selective multiplexing of SSBs within the SMTC window with PDSCH communications.

In an aspect of the disclosure, a method, a user equipment (UE), a base station, an apparatus, and a computer program product are provided.

In some aspects, the method may by performed by a UE. The method may include receiving an instruction to measure a synchronization signal block (SSB); receiving scheduling information that schedules a downlink channel communication in one or more symbols that overlap with the SSB;

determining whether to decode the SSB, the downlink channel communication, or both the SSB and the downlink channel communication; and processing one or more signals received in the one or more symbols based at least in part on the determination.

In some aspects, the UE may include a memory and one or more processors operatively coupled to the memory. The memory and the one or more processors may be configured to receive an instruction to measure a synchronization signal block (SSB); receive scheduling information that schedules a downlink channel communication in one or more symbols that overlap with the SSB; determine whether to decode the SSB, the downlink channel communication, or both the SSB and the downlink channel communication; and process one or more signals received in the one or more symbols based at least in part on the determination.

In some aspects, the apparatus may include means for receiving an instruction to measure a synchronization signal block (SSB); means for receiving scheduling information that schedules a downlink channel communication in one or more symbols that overlap with the SSB; means for determining whether to decode the SSB, the downlink channel communication, or both the SSB and the downlink channel communication; and means for processing one or more signals received in the one or more symbols based at least in part on the determination.

In some aspects, the computer program product may include a non-transitory computer-readable medium storing one or more instructions. The one or more instructions, when executed by one or more processors of a UE, may cause the one or more processors to receive an instruction to measure a synchronization signal block (SSB); receive scheduling information that schedules a downlink channel communication in one or more symbols that overlap with the SSB; determine whether to decode the SSB, the downlink channel communication, or both the SSB and the downlink channel communication; and process one or more signals received in the one or more symbols based at least in part on the determination.

In some aspects, the method may by performed by a base station. The method may include transmitting an instruction to a user equipment (UE) to measure a synchronization signal block (SSB); determining whether to transmit a downlink channel communication in one or more symbols that overlap with the SSB; and transmitting one or more signals in the one or more symbols based at least in part on the determination.

In some aspects, the base station may include a memory and one or more processors operatively coupled to the memory. The memory and the one or more processors may be configured to transmit an instruction to a user equipment (UE) to measure a synchronization signal block (SSB); determine whether to transmit a downlink channel communication in one or more symbols that overlap with the SSB; and transmit one or more signals in the one or more symbols based at least in part on the determination.

In some aspects, the apparatus may include means for transmitting an instruction to a user equipment (UE) to measure a synchronization signal block (SSB); means for determining whether to transmit a downlink channel communication in one or more symbols that overlap with the SSB; and means for transmitting one or more signals in the one or more symbols based at least in part on the determination.

In some aspects, the computer program product may include a non-transitory computer-readable medium storing one or more instructions. The one or more instructions, when executed by one or more processors of a base station, may cause the one or more processors to transmit an instruction to a user equipment (UE) to measure a synchronization signal block (SSB); determine whether to transmit a downlink channel communication in one or more symbols that overlap with the SSB; and transmit one or more signals in the one or more symbols based at least in part on the determination.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
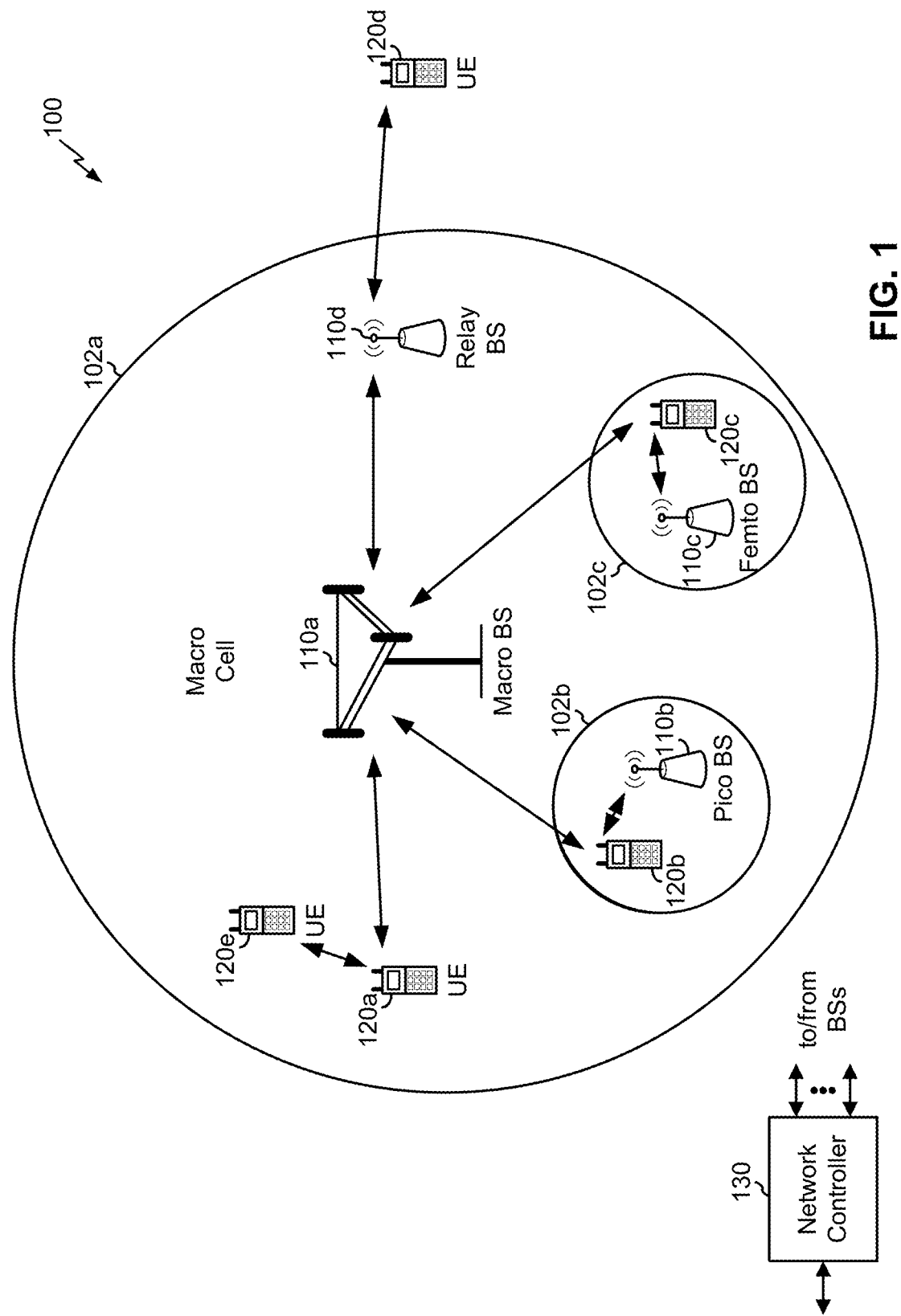
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

ABS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra-reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

In some aspects, a base station 110 may schedule and/or transmit synchronization signal blocks and/or downlink channel communications for a UE 120, as described in more detail elsewhere herein.

As indicated above, FIG. 1 is provided merely as an example. Other examples are possible and may differ from what is described with regard to FIG. 1.

Figure 2:
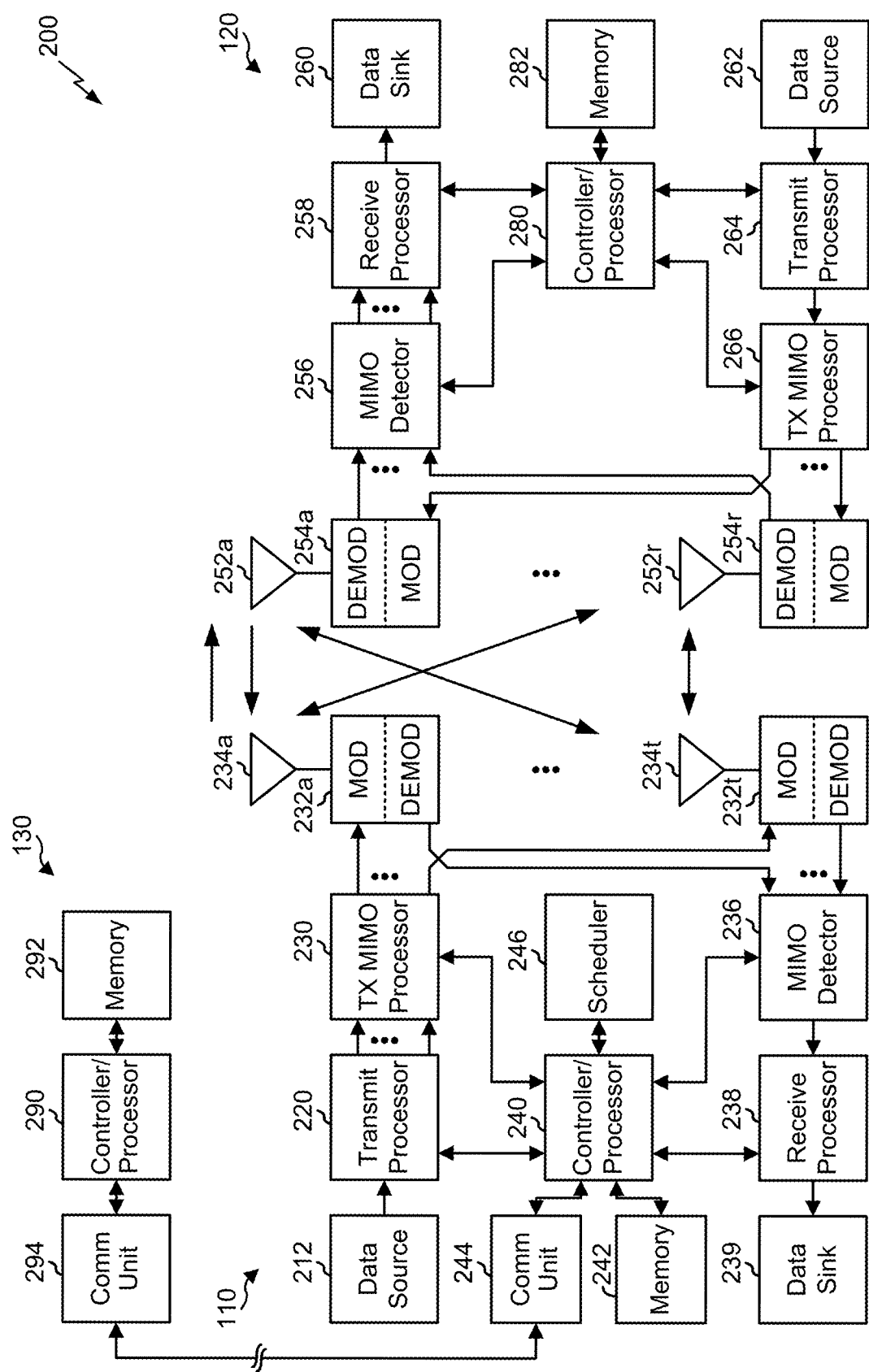
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select a modulation and coding schemes (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with synchronization signal block (SSB) and downlink channel multiplexing, as described in more detail elsewhere herein. For example, controller/processor 240 of base station 110, controller/processor 280 of UE 120, and/or any other component(s) of FIG. 2 may perform or direct operations of, for example, method 600 of FIG. 6, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what is described with regard to FIG. 2.

Figure 3A:
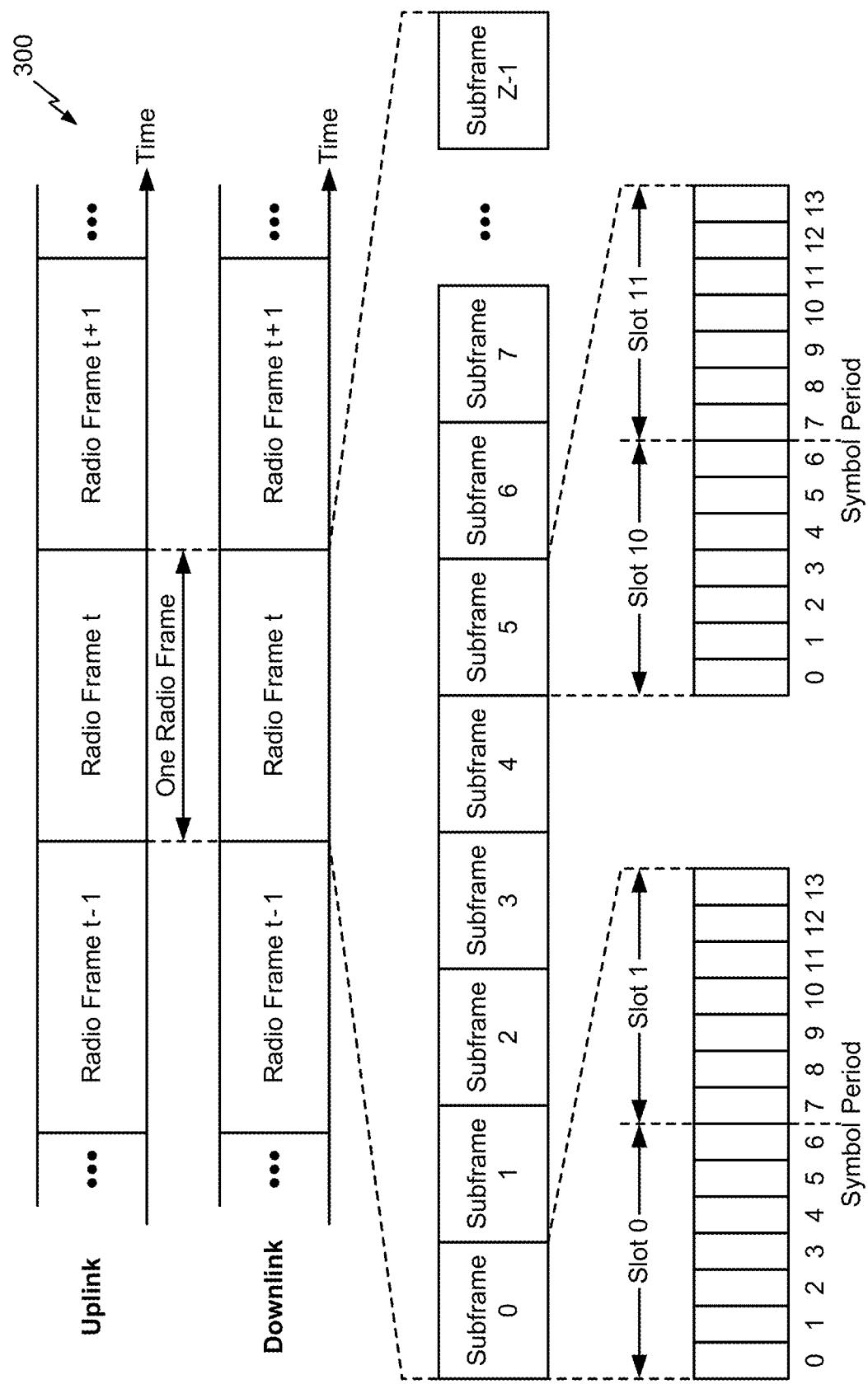
FIG. 3A is a diagram illustrating an example of a frame structure in a wireless communication network.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitioned into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD telecommunications system may be frame-based, subframe-based, slot-based, symbol-based, and/or the like.

While some techniques are described herein in connection with frames, subframes, slots, and/or the like, these techniques may equally apply to other types of wireless communication structures or transmission time intervals, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunication systems (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
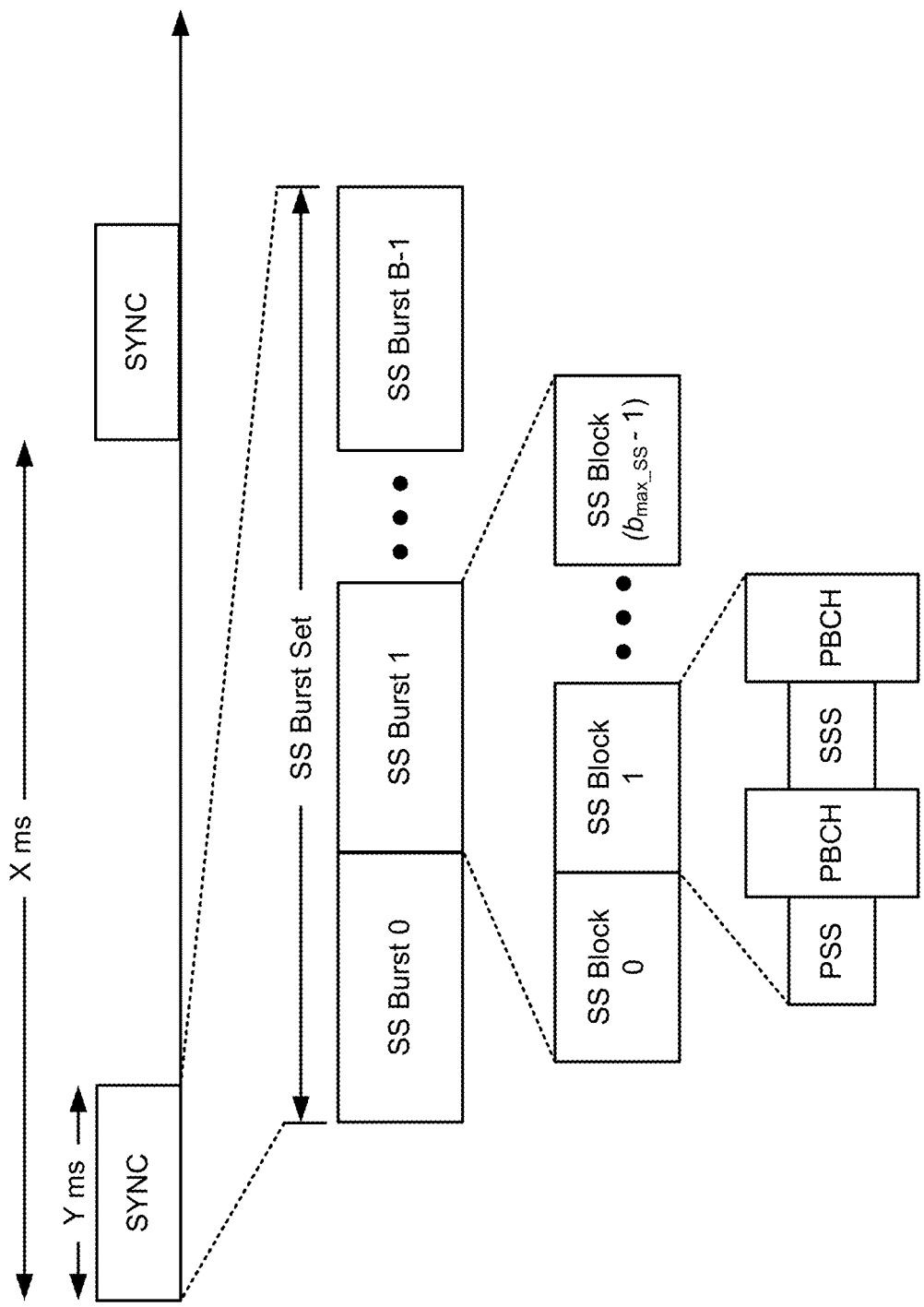
FIG. 3B is a diagram illustrating an example synchronization communication hierarchy in a wireless communication network.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS}-1$), where $b_{max\_SS}-1$ is a maximum number of SS blocks that can be carried by an SS burst). In some aspects, different SS blocks (SSBs) may be beam-formed differently (e.g., targeted in different directions). An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block (SSB) includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B and/or C may be configurable for each subframe. The base station may transmit traffic data and/or other data on the PDSCH in the remaining symbol periods of each subframe.

In some aspects, a UE 120 may measure one or more SSBs in connection with radio resource management. For example, the UE 120 may measure SSBs of a serving cell and/or one or more neighbor cells to assist with cell search, cell selection, cell reselection, handover, and/or the like. For radio resource management, a UE 120 may be configured with an SSB measurement timing configuration (SMTC) window, and a base station 110 may indicate a set of SSBs, within the SMTC window, to be measured by the UE 120 for radio resource management. Alternatively, if the base station 110 does not indicate the set of SSBs to be measured in the SMTC window, then the UE 120 may measure all SSBs within the SMTC window (e.g., according to a preconfigured SSB pattern). Within the SMTC window, the base station 110 may prevent downlink channel communications (e.g., PDSCH communications, PDCCH communications, downlink reference signals, and/or the like) from being scheduled or transmitted in any symbol in which the UE 120 is configured to measure an SSB, and may further prevent downlink channel communications from being scheduled or transmitted one symbol before and one symbol after the SSB.

However, in some cases, a UE 120 may measure one or more SSBs outside of the SMTC window, such as in connection with radio link monitoring. Radio link monitoring may be used to measure a serving cell to maintain a radio link, to determine when radio link failure has occurred, to trigger radio resource control (RRC) connection re-establishment when such radio link failure occurs, and/or the like. Unlike SSB measurements in the SMTC window, which involve measuring neighbor base station SSBs that may be difficult to multiplex, SSB measurements outside of the SMTC window may be performed on serving base station SSBs, which may be multiplexed with other information, such as downlink data channel communications (e.g., PDSCH communications). For example, the serving base station 110 may store information regarding the serving cell SSBs and/or the UEs 120 connected to the serving base station 110 that permit such multiplexing to occur in some situations. Techniques and apparatuses described herein permit selective multiplexing of SSBs outside of an SMTC window with PDSCH communications (also referred to herein as downlink data channel communications) depending on one or more factors, which may increase spectral efficiency due to multiplexing when permitted, and may prevent or reduce collisions and interference when not permitted (e.g., due to quasi co-location constraints, processing constraints, timeline constraints, and/or the like). Additionally, or alternatively, some techniques and apparatuses described herein permit selective multiplexing of SSBs within the SMTC window with PDSCH communications. Additional details are described below.

As indicated above, FIGS. 3A and 3B are provided as examples. Other examples are possible and may differ from what is described with regard to FIGS. 3A and 3B.

Figure 4:
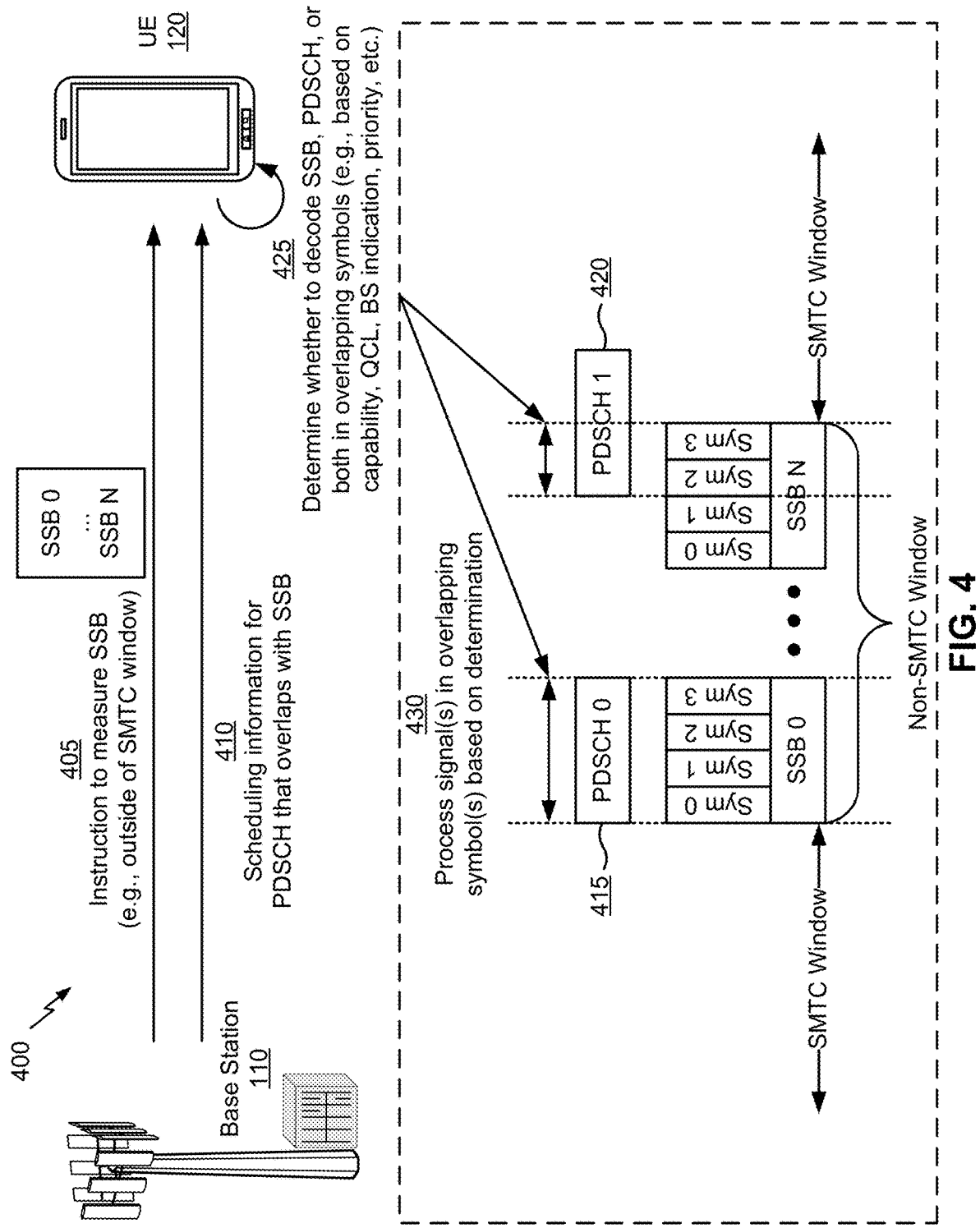
FIGS. 4 and 5 are diagrams illustrating examples of synchronization signal block (SSB) and downlink channel multiplexing.

FIG. 4 is a diagram illustrating an example 400 of SSB and downlink channel multiplexing.

At 405, a base station 110 may transmit, and a UE 120 may receive, an instruction to measure a synchronization signal block (SSB) (e.g., outside of an SSB measurement timing configuration (SMTC) window). As described above in connection with FIG. 3B, the SSB outside of the SMTC window may be associated with radio link monitoring, and the UE 120 may measure the SSB outside of the SMTC window to perform one or more operations associated with radio link monitoring (e.g., to measure parameters of a serving cell, to maintain a radio link, to determine when radio link failure has occurred, to trigger RRC connection re-establishment when such radio link failure occurs, and/or the like). As shown, the base station 110 may indicate, to the UE 120, one or more SSBs to be measured outside of the SMTC using a list of SSBs. The list of SSBs may include, for example, an SSB index corresponding to each SSB to be measured outside of the SMTC window. An SSB index may map to a set of resources to be used to measure a corresponding SSB, and the base station 110 and/or the UE 120 may store a table that indicates this mapping. Thus, the UE 120 may use an SSB index to identify a set of resources, outside of the SMTC window, to be used to measure an SSB.

At 410, the base station 110 may transmit, and the UE 120 may receive, scheduling information that schedules a downlink data channel communication (also referred to herein as a PDSCH communication) in one or more symbols that overlap with the SSB (e.g., in the time domain). The scheduling information may be received, for example, in downlink control information (DCI) on a downlink control channel (e.g., the PDCCH), in an RRC configuration message (e.g., for semi-persistent scheduling, configured scheduling, and/or the like), and/or the like. As used herein, an overlap in symbols may refer to an overlap in the time domain. Such an overlap in symbols may or may not include an overlap in the frequency domain (e.g., may or may not include an overlap in sub-carriers used for the PDSCH communication and the SSB).

At 415, in some aspects, a PDSCH communication may fully overlap the SSB (e.g., in time, but not necessarily in frequency, as shown). For example, the PDSCH communication may be scheduled to occur in all of the symbols of the SSB. Thus, the PDSCH communication may fully overlap the SSB in the time domain. In some aspects, the SSB may include four symbols, and the PDSCH communication may be scheduled to occur in all four symbols. Although the fully overlapping PDSCH communication shown in FIG. 4 (e.g., shown as PDSCH 0) is shown as spanning four symbols, in some aspects, a PDSCH communication that fully overlaps with the SSB may span more than four symbols (e.g., may start earlier and/or end later than the symbols of the SSB).

At 420, in some aspects, a PDSCH communication may partially overlap the SSB (e.g., in time, but not necessarily in frequency, as shown). For example, the PDSCH communication may be scheduled to occur in fewer than all of the symbols of the SSB. Thus, the PDSCH communication may partially overlap the SSB in the time domain. In some aspects, the SSB may include four symbols, and the PDSCH communication may be scheduled to occur in one, two, or three of the four symbols. Although the partially overlapping PDSCH communication shown in FIG. 4 (e.g., shown as PDSCH 1) is shown as occurring partially in overlapping symbols and partially in non-overlapping symbols, in some aspects, a PDSCH communication that partially overlaps with the SSB may occur only in overlapping symbols.

At 425, the UE 120 may determine whether to decode the SSB, the downlink data channel communication, or both the SSB and the downlink data channel communication (e.g., in the one or more overlapping symbols). The determination may be based at least in part on, for example, a capability of the UE 120, properties of respective beams that carry the SSB and the PDSCH communication (e.g., whether the beams are quasi co-located), an indication from the base station 110, a relative priority of the SSB and the PDSCH communication, a configuration of the UE 120 to prioritize the SSB or the PDSCH communication (e.g., by default), and/or the like.

In some aspects, the UE 120 may determine to decode both the SSB and the PDSCH communication in the overlapping symbols. In some aspects, this determination may be based at least in part on a capability of the UE 120, such as when the UE 120 has a capability to process both the SSB and the downlink data channel communication in overlapping symbols regardless of whether beams via which the SSB and the downlink data channel communication are carried are quasi co-located. In this case, if the beams are not quasi co-located, then the UE 120 may be capable of tuning different receive beams (e.g., using beamforming, precoding, different antennas, different antenna elements, different antenna subarrays, and/or the like) in different directions to simultaneously or concurrently receive the SSB on a first beam and the PDSCH communication on a second beam. If the beams are quasi co-located, then the UE 120 may be capable of using one or more properties of one of the beams to determine one or more properties of the other beam.

Additionally, or alternatively, the UE 120 may determine to decode both the SSB and the PDSCH communication based at least in part on a determination that a first beam that carries the SSB and a second beam that carries the PDSCH communication are quasi co-located. When two beams are quasi co-located, one or more properties of one of the beams can be used to infer the corresponding one or more properties of the other beam, such as a delay spread, a Doppler spread, a frequency shift, an average gain, an average delay, an average received power, a received timing, and/or the like. In some aspects, the UE 120 may have a capability to process both the SSB and the downlink data channel communication in overlapping symbols only when the beams used to transmit the SSB and the downlink data channel are carried are quasi co-located. In this case, if the beams are quasi co-located, then the UE 120 may determine to decode both the SSB and the PDSCH communication in the overlapping symbols. However, if the beams are not quasi-located, then the UE 120 may not be capable of decoding both the SSB and the PDSCH communication in the overlapping symbols. In this case, the UE 120 may select one of the SSB or the PDSCH communication for decoding, as described in more detail below.

Additionally or alternatively, the UE 120 may determine to decode both the SSB and the PDSCH communication in the overlapping symbols based at least in part on an indication received from the base station 110. For example, the base station 110 may indicate that the UE 120 is to decode both the SSB and the PDSCH communication. In some aspects, the base station 110 may transmit this indication based at least in part on a capability of the UE 120 (e.g., which may be reported to the base station 110, such as in an RRC configuration message). For example, if the base station 110 receives an indication that the UE 120 is capable of decoding both the SSB and the PDSCH communication in overlapping symbols (e.g., if the beams are quasi co-located or regardless of whether the beams are quasi co-located), then the base station 110 may transmit an indication that the UE 120 is to decode both the SSB and the PDSCH communication (e.g., based at least in part on whether or not the beams are quasi co-located). In some aspects, the indication from the base station 110 may be transmitted with scheduling information that schedules the PDSCH communication. For example, the indication and the scheduling information may be transmitted in the same signaling message (e.g., DCI or the like).

In some aspects, the UE 120 may determine to decode only the SSB and not the PDSCH communication in the overlapping symbols. In some aspects, this determination may be based at least in part on a capability of the UE 120, such as when the UE 120 does not have a capability to process both the SSB and the downlink data channel communication in overlapping symbols regardless of whether beams via which the SSB and the downlink data channel communication are carried are quasi co-located, or when the UE 120 has a capability to process both the SSB and the downlink data channel communication in overlapping symbols only when beams via which the SSB and the downlink data channel communication are carried are quasi co-located. In this case, if the beams are not quasi co-located, then the UE 120 may determine to decode only the SSB and not the PDSCH communication in the overlapping symbols.

In some aspects, the UE 120 may have a capability to process only one of the SSB or the downlink data channel communication in overlapping symbols, regardless of whether the beams via which the SSB and the downlink data channel communication are carried are quasi co-located. In this case, the UE 120 may determine to decode only the SSB and not the PDSCH communication in the overlapping symbols regardless of whether the beams are quasi co-located.

Additionally, or alternatively, the UE 120 may determine to decode only the SSB and not the PDSCH communication in the overlapping symbols based at least in part on an indication received from the base station 110. For example, the base station 110 may indicate that the UE 120 is to decode only the SSB and is not to decode the PDSCH communication in the overlapping symbols. In some aspects, the base station 110 may transmit this indication based at least in part on a capability of the UE 120. For example, if the base station 110 receives an indication that the UE 120 is not capable of decoding both the SSB and the PDSCH communication in overlapping symbols (e.g., if the beams are not quasi co-located or regardless of whether the beams are quasi co-located), then the base station 110 may transmit an indication that the UE 120 is to decode only the SSB and not the PDSCH communication (e.g., based at least in part on whether or not the beams are quasi co-located). In some aspects, the indication from the base station 110 may be transmitted with scheduling information that schedules the PDSCH communication. Additionally, or alternatively, the indication from the base station 110 may be transmitted in DCI or another signaling message. In some aspects, the indication may include a system frame number, an SSB identifier (e.g., an SSB index), one or more resource identifiers, and/or the like, that indicate one or more symbols for which the SSB, and not the PDSCH communication, is to decoded.

Additionally, or alternatively, the UE 120 may determine to decode only the SSB and not the PDSCH communication in the overlapping symbols based at least in part on a first priority level of the SSB and a second priority level of the downlink data channel communication. For example, the UE 120 may decode the SSB and not the PDSCH communication in the overlapping symbols when the SSB has a higher priority than the PDSCH communication. In some aspects, a priority of the SSB and/or the PDSCH communication may be indicated by the base station 110. Additionally, or alternatively, the SSB and/or the PDSCH communication may be associated with a default priority (e.g., the UE 120 may prioritize the SSB over the PDSCH communication by default, unless an indication otherwise is received from the base station 110). In some aspects, the UE 120 may indicate the default priority to the base station 110.

In some aspects, the UE 120 may determine to decode only the PDSCH communication and not the SSB in the overlapping symbols. In some aspects, this determination may be based at least in part on a capability of the UE 120, such as when the UE 120 does not have a capability to process both the SSB and the downlink data channel communication in overlapping symbols regardless of whether beams via which the SSB and the downlink data channel communication are carried are quasi co-located, or when the UE 120 has a capability to process both the SSB and the downlink data channel communication in overlapping symbols only when beams via which the SSB and the downlink data channel communication are carried are quasi co-located. In this case, if the beams are not quasi co-located, then the UE 120 may determine to decode only the PDSCH communication and not the SSB in the overlapping symbols.

In some aspects, the UE 120 may have a capability to process only one of the SSB or the downlink data channel communication in overlapping symbols, regardless of whether the beams via which the SSB and the downlink data channel communication are carried are quasi co-located. In this case, the UE 120 may determine to decode only the PDSCH communication and not the SSB in the overlapping symbols regardless of whether the beams are quasi co-located.

Additionally, or alternatively, the UE 120 may determine to decode only the PDSCH communication and not the SSB in the overlapping symbols based at least in part on an indication received from the base station 110. For example, the base station 110 may indicate that the UE 120 is to decode only the PDSCH communication and is not to decode the SSB in the overlapping symbols. In some aspects, the base station 110 may transmit this indication based at least in part on a capability of the UE 120. For example, if the base station 110 receives an indication that the UE 120 is not capable of decoding both the SSB and the PDSCH communication in overlapping symbols (e.g., if the beams are not quasi co-located or regardless of whether the beams are quasi co-located), then the base station 110 may transmit an indication that the UE 120 is to decode only the PDSCH communication and not the SSB (e.g., based at least in part on whether or not the beams are quasi co-located). In some aspects, the indication from the base station 110 may be transmitted with scheduling information that schedules the PDSCH communication. Additionally, or alternatively, the indication may be transmitted in DCI or a similar signaling message. In some aspects, the indication may include a system frame number, an SSB identifier (e.g., an SSB index), one or more resource identifiers, and/or the like, that indicate one or more symbols for which the PDSCH communication, and not the SSB, is to decoded.

Additionally, or alternatively, the UE 120 may determine to decode only the PDSCH communication and not the SSB in the overlapping symbols based at least in part on a first priority level of the SSB and a second priority level of the downlink data channel communication. For example, the UE 120 may decode the PDSCH communication and not the SSB in the overlapping symbols when the PDSCH communication has a higher priority than the SSB (e.g., when the PDSCH communication carries system information, a system information block, mission critical information, a URLLC communication, and/or the like). In some aspects, a priority of the SSB and/or the PDSCH communication may be indicated by the base station 110. Additionally, or alternatively, the SSB and/or the PDSCH communication may be associated with a default priority. In some aspects, the UE 120 may indicate the default priority to the base station 110.

As shown by reference number 430, the UE 120 may process one or more signals (e.g., the SSB and/or the PDSCH communication) received in the one or more symbols based at least in part on the determination. As described above, in some aspects, processing the one or more signals may include decoding both the SSB and the downlink data channel communication in the one or more symbols. In this case, the UE 120 may configure a first receive beam for reception of the SSB, and may configure a second receive beam for reception of the PDSCH communication. In some aspects, if the beams are quasi co-located, the UE 120 may infer one or more properties of one of the beams from a corresponding one or more properties of the other beam.

Alternatively, processing the one or more signals may include decoding only the SSB and not the downlink data channel communication in the one or more symbols. In this case, the UE 120 may configure a receive beam for reception of the SSB. Additionally, or alternatively, the UE 120 may transmit a negative acknowledgement (NACK) corresponding to the PDSCH communication (e.g., based at least in part on determining that the PDSCH communication is not to be decoded).

Alternatively, processing the one or more signals may include decoding only the downlink data channel communication and not the SSB in the one or more symbols. In this case, the UE 120 may configure a receive beam for reception of the PDSCH communication.

By decoding multiplexed SSBs and PDSCH communications outside of an SMTC window in some scenarios (e.g., based at least in part on one or more factors), the UE 120 and the base station 110 may increase spectral efficiency. Furthermore, when such decoding of multiplexed SSBs and PDSCH communications outside of an SMTC window is not performed in other scenarios (e.g., based at least in part on one or more factors), the UE 120 and the base station 110 may prevent or reduce collisions, errors, and interference.

While some techniques are described herein in connection with multiplexing an SSB and a downlink data channel communication (or PDSCH communication), similar techniques may apply to, for example, multiplexing an SSB and a downlink control channel communication (e.g., a PDCCH communication), multiplexing a SSB and one or more other types of physical channels (e.g., PBCH and/or the like), multiplexing an SSB and one or more reference signals (e.g., one or more downlink reference signals, such as a channel state information reference signal (CSI-RS) from a serving base station, an SSB from the serving base station, and/or the like), and/or the like.

Similarly, while some techniques are described herein in connection with multiplexing an SSB outside of an SMTC window, similar techniques may apply to multiplexing an SSB within (e.g., inside of) an SMTC window. For example, the UE 120 may receive an SSB from a neighbor base station within the SMTC window (e.g., based at least in part on an instruction and/or SSB configuration indicated by the base station 110, such as in an RRC message) and may receive scheduling information from a serving base station for a downlink data channel communication that overlaps with the SSB (e.g., partially or fully in the time domain), in a similar manner as described elsewhere herein. The UE 120 may determine whether to decode the SSB, the downlink data channel communication, or both, in a similar manner as described elsewhere herein. Based at least in part on the determination, the UE 120 may process one or more signals in the overlapping symbol(s), in a similar manner as described elsewhere herein.

As indicated above, FIG. 4 is provided as an example. Other examples are possible and may differ from what is described with respect to FIG. 4.

Figure 5:
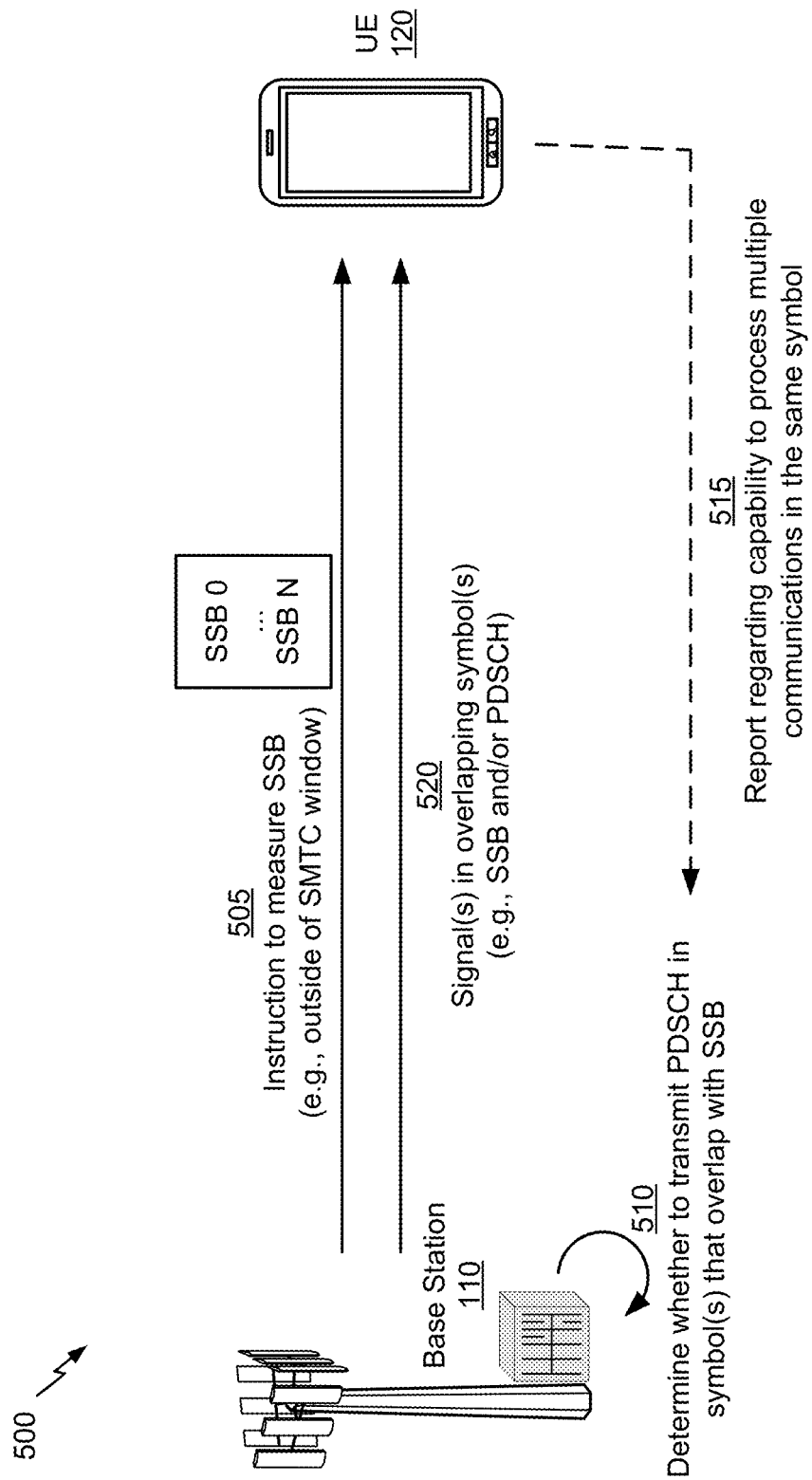

FIG. 5 is a diagram illustrating another example 500 of SSB and downlink channel multiplexing.

At 505, a base station 110 may transmit, and a UE 120 may receive, an instruction to measure an SSB outside of an SMTC window, in a similar manner as described above in connection with FIG. 4. As described elsewhere herein, the SSB outside of the SMTC window may be associated with radio link monitoring, and the UE 120 may measure the SSB outside of the SMTC window to perform one or more operations associated with radio link monitoring.

At 510, the base station 110 may determine whether to transmit a downlink data channel communication (also referred to as a PDSCH communication) in one or more symbols that overlap with the SSB (e.g., in the time domain, and not necessarily in the frequency domain). This determination may be based at least in part on, for example, a capability of the UE 120 (e.g., which may be indicated to the base station 110, such as in a capability report), properties of respective beams that carry the SSB and the PDSCH communication (e.g., whether the beams are quasi co-located), an indication transmitted by the base station 110 to the UE 120, a relative priority of the SSB and the PDSCH communication, and/or the like, in a similar manner as described above in connection with FIG. 4.

At 515, in some aspects, the base station 110 may receive an indication of a capability of the UE 120 with respect to processing multiple communications received in the same symbol. In some aspects, the indication may be included in a UE capability report, which may be indicated in an RRC message during RRC connection configuration or reconfiguration. The base station 110 may use the indication of the capability to determine whether to transmit the downlink data channel communication in one or more symbols that overlap with the SSB.

As described above in connection with FIG. 4, the capability may include, for example, a capability to process both the SSB and the downlink data channel communication in overlapping symbols (e.g., in the time domain) regardless of whether beams via which the SSB and the downlink data channel communication are carried are quasi co-located, a capability to process both the SSB and the downlink data channel communication in overlapping symbols only when beams via which the SSB and the downlink data channel communication are carried are quasi co-located, a capability to process only one of the SSB or the downlink data channel communication in overlapping symbols, and/or the like. Additionally, or alternatively, when the UE 120 is not capable of processing both the SSB and the downlink data channel communication in overlapping symbols regardless of whether respective beams are quasi co-located, then the UE 120 may indicate whether the UE 120 is configured to prioritize decoding of the SSB or to prioritize decoding of the PDSCH communication when both signals are received in an overlapping symbol. In some aspects, the base station 110 may transmit an indication to override this configuration of the UE 120.

Additionally, or alternatively, the base station 110 may determine whether to transmit the downlink data channel communication based at least in part on a determination of whether a first beam that is to carry the SSB and a second beam that is to carry the downlink data channel communication are quasi co-located. For example, if the UE 120 is not capable of decoding both the SSB and the PDSCH communication when the respective beams are not quasi co-located, then the base station 110 may not transmit the PDSCH communication if the PDSCH communication cannot be transmitted on a beam that is not quasi co-located with respect to a beam used to carry the SSB. Similarly, if the UE 120 is capable of decoding both the SSB and the PDSCH communication when the respective beams are quasi co-located, then the base station 110 may transmit the PDSCH communication if the PDSCH communication on a beam that is quasi co-located with respect to a beam used to carry the SSB.

At 520, the base station 110 may transmit one or more signals (e.g., the SSB and/or the PDSCH communication) in the one or more symbols based at least in part on the determination of whether to transmit the downlink data channel communication in the one or more symbols that overlap with one or more symbols of the SSB.

In some aspects, the base station 110 may transmit both the SSB and the PDSCH communication in the one or more symbols. In this case, the base station 110 may transmit an indication, to the UE 120, of whether to prioritize the SSB or the PDSCH communication. For example, the base station 110 may transmit this indication if the UE 120 is not capable of decoding both the SSB and the PDSCH communication. Additionally, or alternatively, the base station 110 may transmit this indication if the UE 120 is capable of decoding both the SSB and the PDSCH communication, but is configured with an option to select only one of the signals to decode (e.g., based at least in part on an operating condition of the UE 120). In some aspects, the indication may include a system frame number, an SSB identifier (e.g., an SSB index), one or more resource identifiers, and/or the like, that indicate one or more symbols for which either only the SSB (and not the PDSCH communication) or for which only the PDSCH communication (and not the SSB) is to prioritized and/or decoded by the UE 120. In some aspects, the base station 110 may indicate that the PDSCH communication is to be prioritized when the PDSCH communication includes, for example, system information, a system information block, mission critical information, a URLLC communication, and/or the like.

In some aspects, the base station 110 may transmit only the SSB, and not the PDSCH communication, in the one or more symbols. In this case, the base station 110 may still schedule and/or transmit PDSCH communications for one or more other UEs 120 in the one or more symbols. In some cases, the base station 110 may initially schedule a PDSCH communication in the one or more symbols (e.g., partially or fully, as described above in connection with FIG. 4), and may later drop the PDSCH communication from the one or more symbols (e.g., by preventing the PDSCH communication from being transmitted in the one or more symbols after being scheduled for the one or more symbols).

For example, the PDSCH communication may be initially scheduled for the UE 120 in the one or more symbols using semi-persistent scheduling, configured scheduling, scheduling information transmitted in an RRC message, and/or the like. In this case, if the base station 110 later determines that the one or more symbols overlap with an SSB indicated to the UE 120, and that the UE 120 is not capable of decoding both the SSB and the PDSCH communication, then the base station 110 may drop the PDSCH communication in the one or more symbols. Additionally, or alternatively, the PDSCH communication may be initially scheduled for the UE 120 using slot aggregation (e.g., where different redundancy versions of the PDSCH communication are transmitted in different slots). In this case, if the base station 110 determines that one or more symbols of one or more slots used to perform slot aggregation for the PDSCH communication overlap with an SSB indicated to the UE 120, and that the UE 120 is not capable of decoding both the SSB and the PDSCH communication, then the base station 110 may drop the PDSCH communication in the one or more symbols.

In some aspects, the base station 110 may fully drop the PDSCH communication by dropping one or more portions of the PDSCH communication that occur in overlapping symbols and also dropping one or more portions of the PDSCH communication that occur in non-overlapping symbols. Alternatively, the base station 110 may partially drop the PDSCH communication by dropping one or more portions of the PDSCH communication that occur in overlapping symbols and transmitting one or more portions of the PDSCH communication that occur in non-overlapping symbols.

In some aspects, if the PDSCH communication is initially scheduled using semi-persistent scheduling or configured scheduling, and is later dropped, then the base station 110 may reschedule the PDSCH communication for later transmission based at least in part on an assumption of a negative acknowledgement (NACK), from the UE 120, corresponding to the dropped PDSCH communication. For example, the base station 110 may reschedule and/or transmit the PDSCH communication for another set of symbols without waiting for acknowledgement or negative acknowledgement (ACK/NACK) feedback from the UE 120, or regardless of ACK/NACK feedback received from the UE 120 in connection with the overlapping symbols.

In some aspects, if the PDSCH communication is initially scheduled using slot aggregation, and is later dropped, then the base station 110 may reschedule and/or retransmit the PDSCH communication if the base station 110 does not receive an ACK for one or more other PDSCH communications that are aggregated with the dropped PDSCH communication. In this case, the UE 120 may be able to correctly receive information carried by the dropped PDSCH communication by decoding the one or more other PDSCH communications (e.g., which may be different redundancy versions of the dropped PDSCH communication). In this case, if the UE 120 transmits an ACK for one of these communications, then the base station 110 may not reschedule or retransmit the dropped PDSCH communication, thereby conserving network resources and resources of the base station 110 that would otherwise be used for such rescheduling or retransmission.

By multiplexing SSBs and PDSCH communications outside of an SMTC window in some scenarios (e.g., based at least in part on one or more factors), the UE 120 and the base station 110 may increase spectral efficiency. Furthermore, when such multiplexing of SSBs and PDSCH communications outside of an SMTC window is not performed in other scenarios (e.g., based at least in part on one or more factors), the UE 120 and the base station 110 may prevent or reduce collisions, errors, and interference.

While aspects are described herein in connection with multiplexing an SSB and a downlink data channel communication (or PDSCH communication), similar techniques may apply to, for example, multiplexing an SSB and a downlink control channel communication (e.g., a PDCCH communication), multiplexing a SSB and one or more other types of physical channels (e.g., PBCH and/or the like), multiplexing an SSB and one or more reference signals (e.g., a channel state information reference signal (CSI-RS) and/or the like), and/or the like.

As indicated above, FIG. 5 is provided as an example. Other examples are possible and may differ from what is described with respect to FIG. 5.

Figure 6:
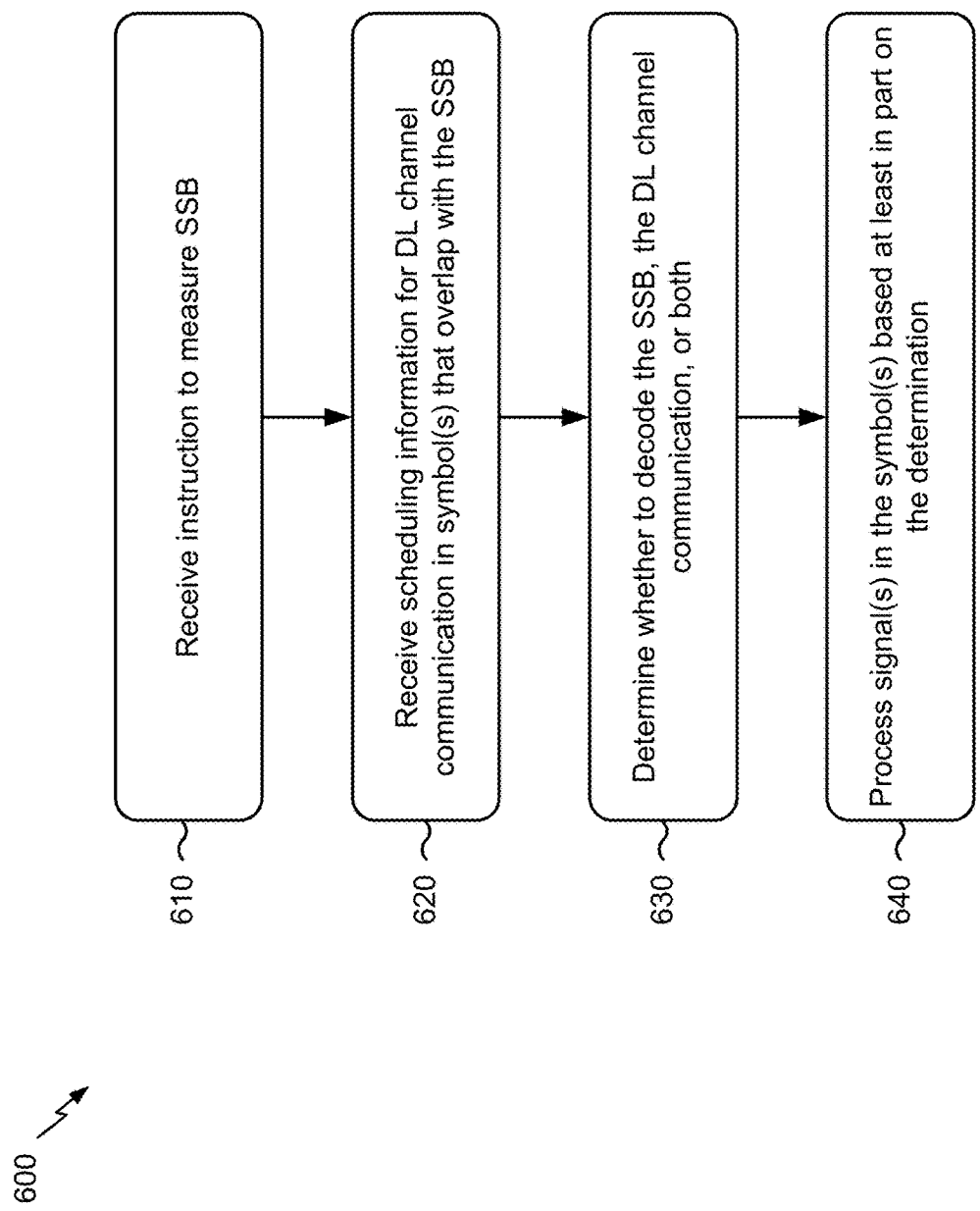
FIGS. 6 and 7 are flow charts of methods of wireless communication.

FIG. 6 is a flow chart of a method 600 of wireless communication. The method may be performed by a UE (e.g., the UE 120 of FIG. 1, the UE 120 of FIG. 4, the UE 120 of FIG. 5, the apparatus 800/802' of FIG. 8 and/or FIG. 9, and/or the like).

At 610, the UE may receive an instruction to measure a synchronization signal block (SSB). For example, the UE (e.g., using antenna 252, DEMOD 254, MIMO detector 256, receive processor 258, controller/processor 280, and/or the like) may receive an instruction to measure an SSB, as described above in connection with FIGS. 4-5. In some aspects, the SSB may be outside of an SSB measurement timing configuration (SMTC) window. In this case, the UE may receive an instruction to measure an SSB outside of the SMTC window.

At 620, the UE may receive scheduling information that schedules a downlink channel communication in one or more symbols that overlap with the SSB. For example, the UE (e.g., using antenna 252, DEMOD 254, MIMO detector 256, receive processor 258, controller/processor 280, and/or the like) may receive scheduling information that schedules a downlink channel communication in one or more symbols that overlap with the SSB, as described above in connection with FIGS. 4-5.

At 630, the UE may determine whether to decode the SSB, the downlink channel communication, or both the SSB and the downlink channel communication. For example, the UE (e.g., using controller/processor 280 and/or the like) may determine whether to decode the SSB, the downlink channel communication, or both the SSB and the downlink channel communication, as described above in connection with FIGS. 4-5

At 640, the UE may process one or more signals received in the one or more symbols based at least in part on the determination. For example, the UE (e.g., using controller/processor 280 and/or the like) may process one or more signals received in the one or more symbols based at least in part on the determination, as described above in connection with FIGS. 4-5

Method 600 may include additional aspects, such as any single aspect or any combination of aspects described below and/or in connection with one or more other processes described elsewhere herein.

In some aspects, processing the one or more signals comprises decoding both the SSB and the downlink channel communication in the one or more symbols. In some aspects, processing the one or more signals comprises decoding only the SSB and not the downlink channel communication in the one or more symbols. In some aspects, the UE is configured to send a negative acknowledgement (NACK) corresponding to the downlink channel communication based at least in part on a determination that the downlink channel communication is not to be decoded. In some aspects, processing the one or more signals comprises decoding only the downlink channel communication and not the SSB in the one or more symbols.

In some aspects, the determination of whether to decode the SSB, the downlink channel communication, or both the SSB and the downlink channel communication is based at least in part on a capability of the UE. In some aspects, the capability is indicated to a base station. In some aspects, the capability includes at least one of: a capability to process both the SSB and the downlink channel communication in overlapping symbols regardless of whether beams via which the SSB and the downlink channel communication are carried are quasi co-located, a capability to process both the SSB and the downlink channel communication in overlapping symbols only when beams via which the SSB and the downlink channel communication are carried are quasi co-located, or a capability to process only one of the SSB or the downlink channel communication in overlapping symbols.

In some aspects, the determination of whether to decode the SSB, the downlink channel communication, or both the SSB and the downlink channel communication is based at least in part on a determination of whether a first beam that carries the SSB and a second beam that carries the downlink channel communication are quasi co-located. In some aspects, the determination of whether to decode the SSB, the downlink channel communication, or both the SSB and the downlink channel communication is based at least in part on an indication received from a base station. In some aspects, the indication includes at least one of a system frame number or an SSB identifier.

In some aspects, the determination of whether to decode the SSB, the downlink channel communication, or both the SSB and the downlink channel communication is based at least in part on a first priority level of the SSB and a second priority level of the downlink channel communication. In some aspects, the SSB is associated with radio link monitoring. In some aspects, the downlink channel communication includes at least one of a downlink data channel communication, a downlink control channel communication, or a downlink reference signal from a serving base station of the UE. In some aspects, the one or more symbols of the downlink channel communication overlap with one or more symbols of the SSB in a time domain.

Although FIG. 6 shows example blocks of a method 600 of wireless communication, in some aspects, the method 600 may include additional blocks, fewer blocks, different blocks, or differently arranged blocks than those shown in FIG. 6. Additionally, or alternatively, two or more blocks shown in FIG. 6 may be performed in parallel.

Figure 7:
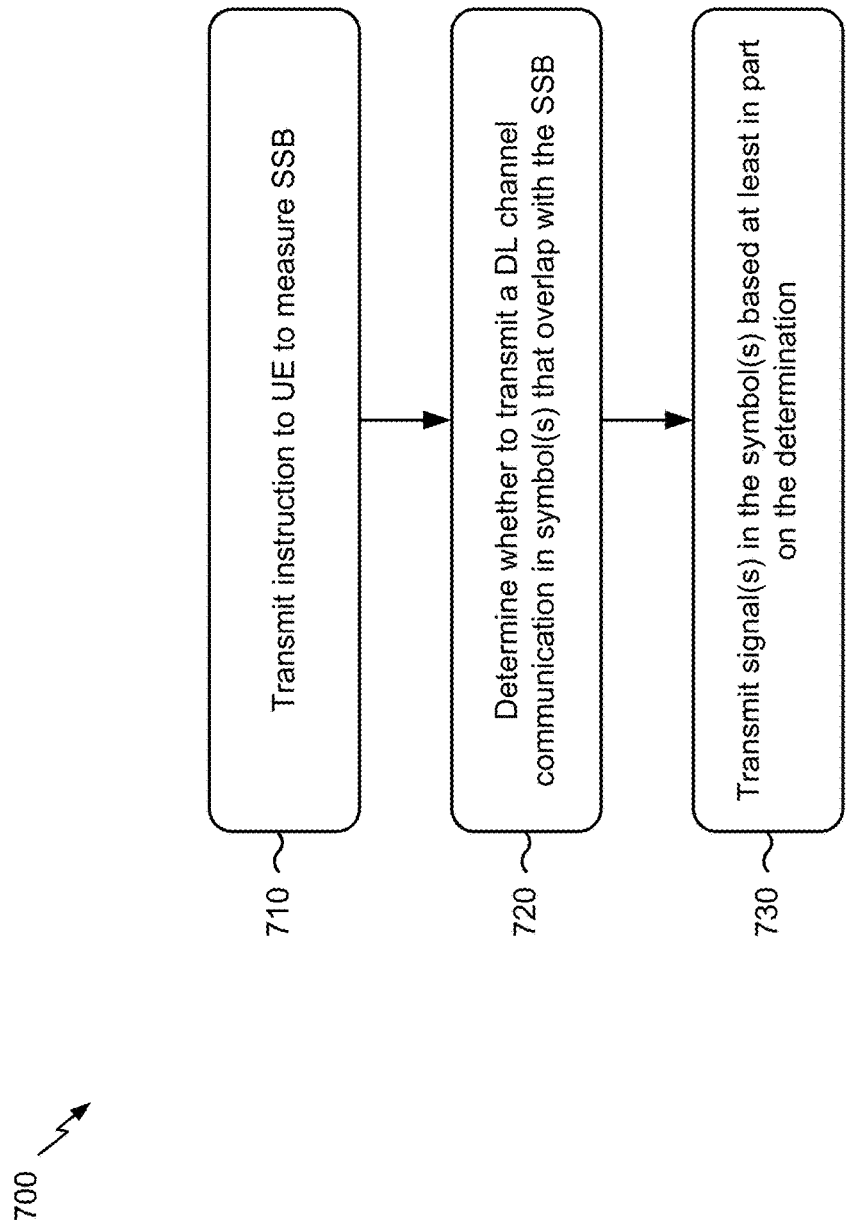

FIG. 7 is a flow chart of a method 700 of wireless communication. The method may be performed by a base station (e.g., the base station 110 of FIG. 1, the base station 110 of FIG. 4, the base station 110 of FIG. 5, the apparatus 1000/1002' of FIG. 10 and/or FIG. 11, and/or the like).

At 710, the base station may transmit an instruction to a user equipment (UE) to measure a synchronization signal block (SSB). For example, the base station (e.g., using controller/processor 240, transmit processor 220, TX MIMO processor 230, MOD 232, antenna 234, and/or the like) may transmit an instruction to a UE to measure an SSB, as described above in connection with FIGS. 4-5. In some aspects, the SSB may be outside of an SMTC window. In this case, the base station may transmit an instruction to the UE to measure the SSB outside of the SMTC window.

At 720, the base station may determine whether to transmit a downlink channel communication in one or more symbols that overlap with the SSB. For example, the base station (e.g., using controller/processor 240 and/or the like) may determine whether to transmit a downlink channel communication in one or more symbols that overlap with the SSB, as described above in connection with FIGS. 4-5.

At 730, the base station may transmit one or more signals in the one or more symbols based at least in part on the determination. For example, the base station (e.g., using controller/processor 240, transmit processor 220, TX MIMO processor 230, MOD 232, antenna 234, and/or the like) may transmit one or more signals in the one or more symbols based at least in part on the determination, as described above in connection with FIGS. 4-5.

Method 700 may include additional aspects, such as any single aspect or any combination of aspects described below and/or in connection with one or more other processes described elsewhere herein.

In some aspects, transmitting the one or more signals comprises transmitting both the SSB and the downlink channel communication in the one or more symbols. In some aspects, the base station is configured to transmit an indication, to the UE, of whether to prioritize the SSB or the downlink channel communication. In some aspects, the indication includes at least one of a system frame number or an SSB identifier.

In some aspects, transmitting the one or more signals comprises transmitting only the SSB and not the downlink channel communication in the one or more symbols. In some aspects, the base station is configured to transmit one or more downlink channel communications to one or more other UEs in the one or more symbols. In some aspects, the downlink channel communication is scheduled in the one or more symbols but is prevented from being transmitted in the one or more symbols. In some aspects, the downlink channel communication is partially or fully dropped. In some aspects, the downlink channel communication is scheduled via semi-persistent scheduling or configured scheduling. In some aspects, the base station is configured to reschedule or retransmit the downlink channel communication based at least in part on an assumption of a negative acknowledgement (NACK) corresponding to the downlink channel communication. In some aspects, the downlink channel communication is scheduled via slot aggregation. In some aspects, the base station is configured to retransmit the downlink channel communication if an acknowledgement (ACK), corresponding to one or more other downlink channel communications that are aggregated with the downlink channel communication, is not received from the UE.

In some aspects, the determination of whether to transmit the downlink channel communication is based at least in part on a capability of the UE. In some aspects, the capability is indicated to the base station by the UE. In some aspects, the capability includes at least one of: a capability to process both the SSB and the downlink channel communication in overlapping symbols regardless of whether beams via which the SSB and the downlink channel communication are carried are quasi co-located, a capability to process both the SSB and the downlink channel communication in overlapping symbols only when beams via which the SSB and the downlink channel communication are carried are quasi co-located, or a capability to process only one of the SSB or the downlink channel communication in overlapping symbols.

In some aspects, the determination of whether to transmit the downlink channel communication is based at least in part on a determination of whether a first beam that is to carry the SSB and a second beam that is to carry the downlink channel communication are quasi co-located. In some aspects, the SSB is associated with radio link monitoring. In some aspects, the one or more symbols of the downlink channel communication overlap with one or more symbols of the SSB in a time domain.

Although FIG. 7 shows example blocks of a method 700 of wireless communication, in some aspects, the method 700 may include additional blocks, fewer blocks, different blocks, or differently arranged blocks than those shown in FIG. 7. Additionally, or alternatively, two or more blocks shown in FIG. 7 may be performed in parallel.

Figure 8:
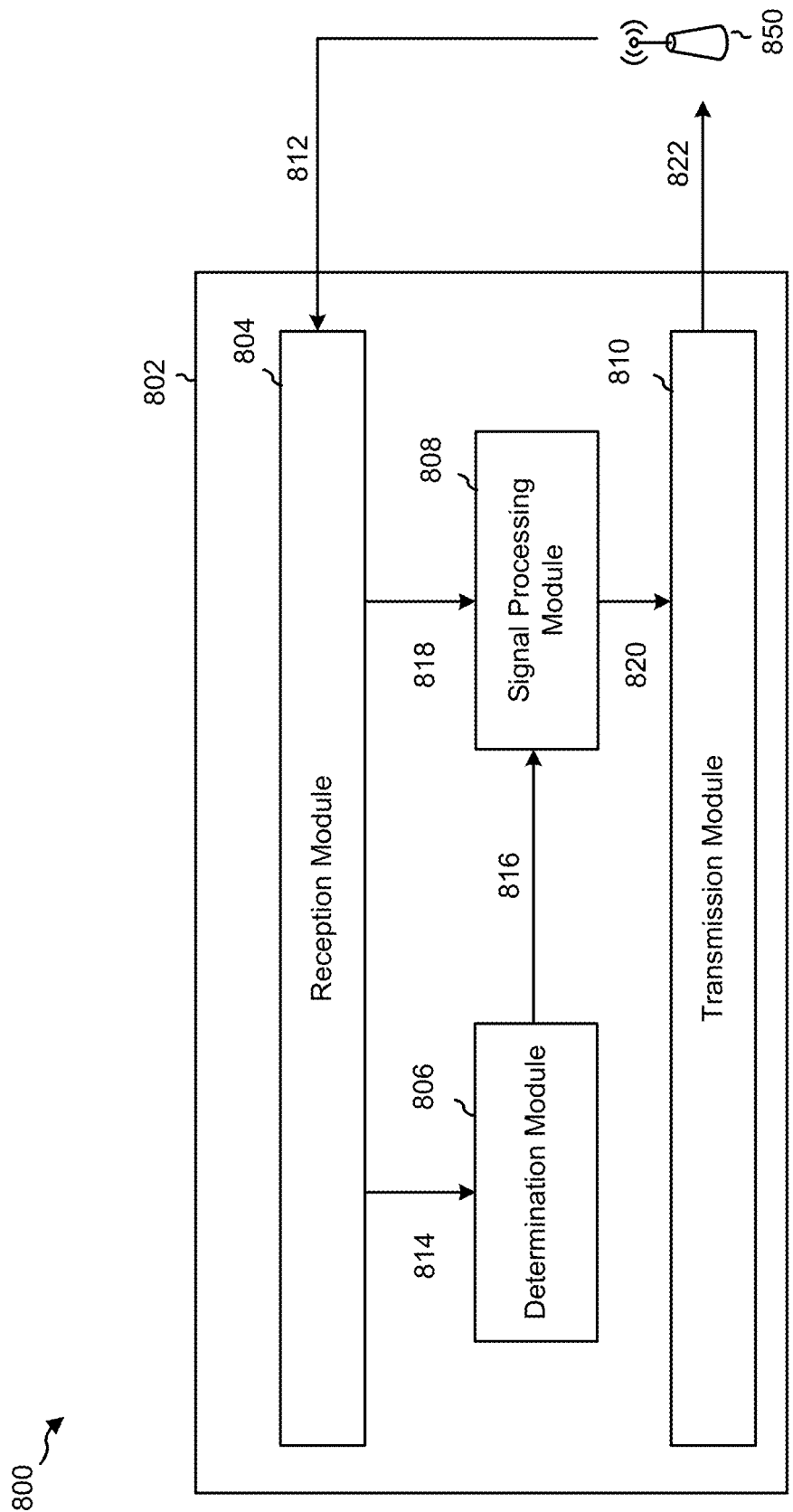
FIG. 8 is a conceptual data flow diagram illustrating the data flow between different modules/means/components in an example apparatus.

FIG. 8 is a conceptual data flow diagram 800 illustrating the data flow between different modules/means/components in an example apparatus 802. The apparatus 802 may be a UE. In some aspects, the apparatus 802 includes a reception module 804, a determination module 806, a signal processing module 808, a transmission module 810, and/or the like.

The reception module 804 may receive, as data 812 from an apparatus 850 (e.g., a base station), an instruction to measure an SSB outside of an SMTC window and/or may receive, as data 812 from the apparatus 850, scheduling information that schedules a downlink channel communication in one or more symbols that overlap with the SSB. The determination module 806 may receive such information from the reception module 804 as data 814, and may determine whether to decode the SSB, the downlink channel communication, or both the SSB and the downlink channel communication. The determination module 806 may provide a result of the determination to the signal processing module 808 as data 816. The signal processing module 808 may use this result and/or information regarding the instruction and/or the scheduling information, received from reception module 804 as data 818, to process one or more signals received in the one or more symbols. In some aspects, the signal processing module 808 may provide data 820 to the transmission module 810, such as a result of the processing the one or more signals. Based at least in part on the result of the processing, the transmission module 810 may transmit data 822 to the apparatus 850 (e.g., ACK/NACK feedback and/or other information).

The apparatus may include additional modules that perform each of the blocks of the algorithm in the aforementioned method 600 of FIG. 6 and/or the like. As such, each block in the aforementioned method 600 of FIG. 6 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
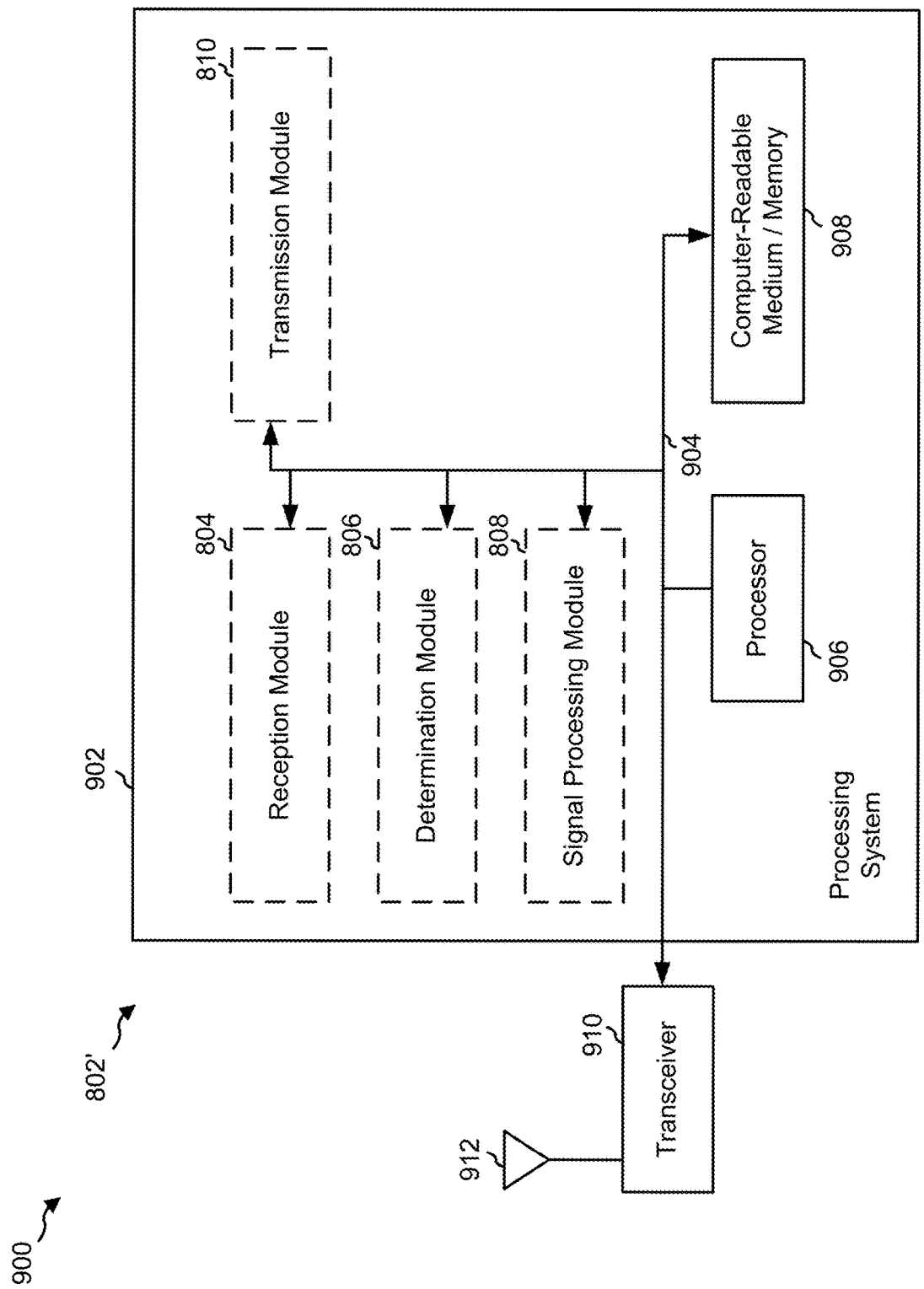
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a UE.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, and/or 810, and the computer-readable medium/memory 908. The bus 904 may also link various other circuits such as timing sources, peripherals, voltage regulators, and power management circuits, which are well known in the art, and therefore, will not be described any further.

The processing system 902 may be coupled to a transceiver 910. The transceiver 910 is coupled to one or more antennas 912. The transceiver 910 provides a means for communicating with various other apparatus over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 810, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, 808, and/or 810. The modules may be software modules running in the processor 906, resident/stored in the computer readable medium/memory 908, one or more hardware modules coupled to the processor 906, or some combination thereof. The processing system 902 may be a component of the UE 120 and may include the memory 282 and/or at least one of the TX MIMO processor 266, the RX processor 258, and/or the controller/processor 280.

In some aspects, the apparatus 802/802' for wireless communication includes means for receiving an instruction to measure a synchronization signal block (SSB); means for receiving scheduling information that schedules a downlink channel communication in one or more symbols that overlap with the SSB; means for determining whether to decode the SSB, the downlink channel communication, or both the SSB and the downlink channel communication; means for processing one or more signals received in the one or more symbols based at least in part on the determination; and/or the like. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform functions and/or operations described herein.

FIG. 9 is provided as an example. Other examples are possible and may differ from what is described in connection with FIG. 9.

Figure 10:
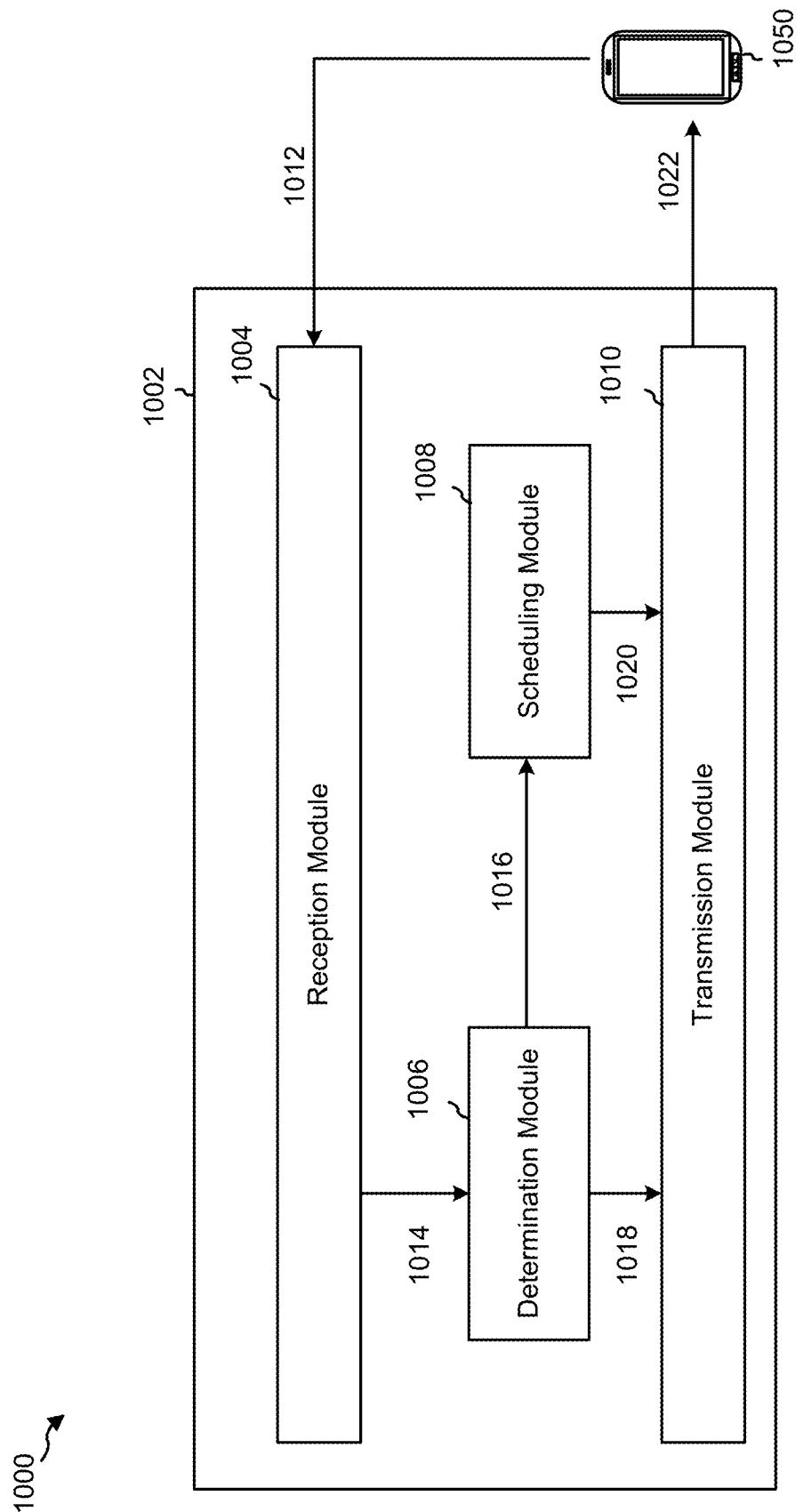
FIG. 10 is a conceptual data flow diagram illustrating the data flow between different modules/means/components in another example apparatus.

FIG. 10 is a conceptual data flow diagram 1000 illustrating the data flow between different modules/means/components in an example apparatus 1002. The apparatus 1002 may be a base station. In some aspects, the apparatus 1002 includes a reception module 1004, a determination module 1006, a scheduling module 1008, a transmission module 1010, and/or the like.

The transmission module 1010 may transmit an instruction to an apparatus 1050 (e.g., a UE), as data 1022, to measure an SSB outside of an SMTC window. In some aspects, the reception module 1004 may receive data 1012 from the apparatus 1050, such as an indication of a capability of the apparatus 1050. The reception module 1004 may provide this indication to the determination module 1006 as data 1014. The determination module 1006 may determine (e.g., based at least in part on the data 1014) whether to transmit a downlink channel communication in one or more symbols that overlap with the SSB (e.g., an SSB scheduled by the scheduling module 1008 and/or to be transmitted by the transmission module 1010). The determination module 1006 may provide a result of the determination to the scheduling module 1008 as data 1018, and the scheduling module 1008 may selectively schedule (e.g., schedule or not schedule) the downlink channel communication in the one or more symbols based at least in part on the data 1018. Additionally, or alternatively, the determination module 1006 may provide a result of the determination to the transmission module 1010 as data 1018, and the transmission module 1010 may selectively transmit (e.g., transmit or not transmit) the downlink channel communication in the one or more symbols based at least in part on the data 1016 and/or scheduling information received from the scheduling module 1008 as data 1020. The transmission module 1010 may transmit one or more signals to the apparatus 1050, as data 1022, in the one or more symbols based at least in part on the data 1018 and/or the data 1020.

The apparatus may include additional modules that perform each of the blocks of the algorithm in the aforementioned method 700 of FIG. 7 and/or the like. As such, each block in the aforementioned method 700 of FIG. 7 and/or the like may be performed by a module, and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 10 are provided as an example. In practice, there may be additional modules, fewer modules, different modules, or differently arranged modules than those shown in FIG. 10. Furthermore, two or more modules shown in FIG. 10 may be implemented within a single module, or a single module shown in FIG. 10 may be implemented as multiple, distributed modules. Additionally, or alternatively, a set of modules (e.g., one or more modules) shown in FIG. 10 may perform one or more functions described as being performed by another set of modules shown in FIG. 10.

Figure 11:
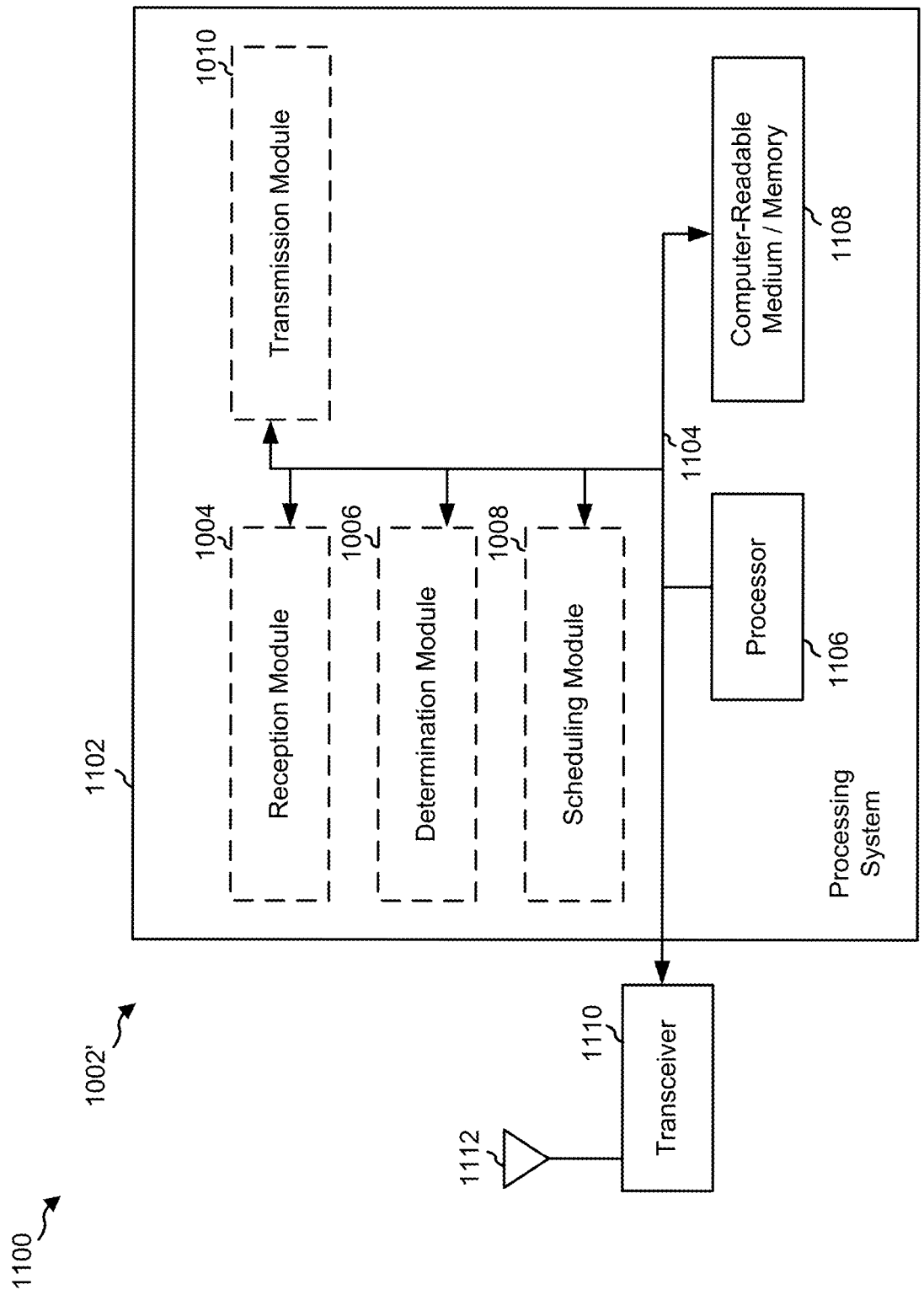
FIG. 11 is a diagram illustrating another example of a hardware implementation for an apparatus employing a processing system.

FIG. 11 is a diagram 1100 illustrating an example of a hardware implementation for an apparatus 1002' employing a processing system 1102. The apparatus 1002' may be a base station.

The processing system 1102 may be implemented with a bus architecture, represented generally by the bus 1104. The bus 1104 may include any number of interconnecting buses and bridges depending on the specific application of the processing system 1102 and the overall design constraints. The bus 1104 links together various circuits including one or more processors and/or hardware modules, represented by the processor 1106, the modules 1004, 1006, 1008, and/or 1010, and the computer-readable medium/memory 1108. The bus 1104 may also link various other circuits such as timing sources, peripherals, voltage regulators, and power management circuits, which are well known in the art, and therefore, will not be described any further.

The processing system 1102 may be coupled to a transceiver 1110. The transceiver 1110 is coupled to one or more antennas 1112. The transceiver 1110 provides a means for communicating with various other apparatus over a transmission medium. The transceiver 1110 receives a signal from the one or more antennas 1112, extracts information from the received signal, and provides the extracted information to the processing system 1102, specifically the reception module 1004. In addition, the transceiver 1110 receives information from the processing system 1102, specifically the transmission module 1010, and based at least in part on the received information, generates a signal to be applied to the one or more antennas 1112. The processing system 1102 includes a processor 1106 coupled to a computer-readable medium/memory 1108. The processor 1106 is responsible for general processing, including the execution of software stored on the computer-readable medium/memory 1108. The software, when executed by the processor 1106, causes the processing system 1102 to perform the various functions described herein for any particular apparatus. The computer-readable medium/memory 1108 may also be used for storing data that is manipulated by the processor 1106 when executing software. The processing system further includes at least one of the modules 1004, 1006, 1008, and/or 1010. The modules may be software modules running in the processor 1106, resident/stored in the computer readable medium/memory 1108, one or more hardware modules coupled to the processor 1106, or some combination thereof. The processing system 1102 may be a component of the base station 110 and may include the memory 242 and/or at least one of the TX MIMO processor 230, the RX processor 238, and/or the controller/processor 240.

In some aspects, the apparatus 1002/1002' for wireless communication includes means for transmitting an instruction to a user equipment (UE) to measure a synchronization signal block (SSB); means for determining whether to transmit a downlink channel communication in one or more symbols that overlap with the SSB; means for transmitting one or more signals in the one or more symbols based at least in part on the determination; and/or the like. The aforementioned means may be one or more of the aforementioned modules of the apparatus 1002 and/or the processing system 1102 of the apparatus 1002' configured to perform the functions recited by the aforementioned means. As described elsewhere herein, the processing system 1102 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform functions and/or operations described herein.

FIG. 11 is provided as an example. Other examples are possible and may differ from what is described in connection with FIG. 11.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
   receiving an instruction to measure a synchronization signal block (SSB);
   receiving scheduling information that schedules a downlink channel communication in one or more symbols that overlap with the SSB;
   determining whether to decode the SSB, the downlink channel communication, or both the SSB and the downlink channel communication based at least in part on at least one of:
      a capability of the UE,
      a determination of whether a first beam that carries the SSB and a second beam that carries the downlink channel communication are quasi co-located,
      an indication received from a base station, or
      a first priority level of the SSB and a second priority level of the downlink channel communication; and
   processing one or more signals received in the one or more symbols based at least in part on the determination.

2. The method of claim 1, wherein the SSB is outside of an SSB measurement timing configuration (SMTC) window.

3. The method of claim 1, wherein processing the one or more signals comprises one of:
   decoding both the SSB and the downlink channel communication in the one or more symbols,
   decoding only the SSB and not the downlink channel communication in the one or more symbols, or
   decoding only the downlink channel communication and not the SSB in the one or more symbols.

4. The method of claim 1, wherein the UE is configured to send a negative acknowledgement (NACK) corresponding to the downlink channel communication based at least in part on a determination that the downlink channel communication is not to be decoded.

5. The method of claim 1, wherein the capability is indicated to a base station.

6. The method of claim 1, wherein the capability indicates that the UE can:
   process both the SSB and the downlink channel communication in overlapping symbols regardless of whether beams via which the SSB and the downlink channel communication are carried are quasi co-located,
   process both the SSB and the downlink channel communication in overlapping symbols only when beams via which the SSB and the downlink channel communication are carried are quasi co-located, or
   process only one of the SSB or the downlink channel communication in overlapping symbols.

7. The method of claim 1, wherein the indication includes at least one of a system frame number or an SSB identifier.

8. The method of claim 1, wherein the SSB is associated with radio link monitoring.

9. The method of claim 1, wherein the downlink channel communication includes at least one of a downlink data channel communication, a downlink control channel communication, or a downlink reference signal from a serving base station of the UE.

10. The method of claim 1, wherein the one or more symbols of the downlink channel communication overlap with one or more symbols of the SSB in a time domain.

11. A method of wireless communication performed by a base station, comprising:
   transmitting an instruction to a user equipment (UE) to measure a synchronization signal block (SSB);
   determining whether to transmit a downlink channel communication in one or more symbols that overlap with the SSB based at least in part on at least one of:
      a capability of the UE, or
      whether a first beam that is to carry the SSB and a second beam that is to carry the downlink channel communication are quasi co-located; and
   transmitting one or more signals in the one or more symbols based at least in part on the determination.

12. The method of claim 11, wherein the SSB is outside of an SSB measurement timing configuration (SMTC) window.

13. The method of claim 11, wherein transmitting the one or more signals comprises transmitting both the SSB and the downlink channel communication in the one or more symbols.

14. The method of claim 13, wherein the base station is configured to transmit an indication, to the UE, of whether to prioritize the SSB or the downlink channel communication.

15. The method of claim 11, wherein transmitting the one or more signals comprises transmitting only the SSB and not the downlink channel communication in the one or more symbols.

16. The method of claim 15, wherein the base station is configured to transmit one or more downlink channel communications to one or more other UEs in the one or more symbols.

17. The method of claim 15, wherein the downlink channel communication is scheduled in the one or more symbols but is prevented from being transmitted in the one or more symbols by partially or fully dropping the downlink channel communication.

18. The method of claim 17, wherein the downlink channel communication is scheduled via semi-persistent scheduling or configured scheduling.

19. The method of claim 18, wherein the base station is configured to reschedule the downlink channel communication.

20. The method of claim 17, wherein the downlink channel communication is scheduled via slot aggregation.

21. The method of claim 20, wherein the base station is configured to transmit the downlink channel communication if an acknowledgement (ACK), corresponding to one or more other downlink channel communications that are aggregated with the downlink channel communication, is not received from the UE.

22. The method of claim 11, wherein the SSB is associated with radio link monitoring.

23. The method of claim 11, wherein the one or more symbols of the downlink channel communication overlap with one or more symbols of the SSB in a time domain.

24. A user equipment (UE) for wireless communication, comprising:
memory; and
one or more processors operatively coupled to the memory, the memory and the one or more processors configured to:
receive an instruction to measure a synchronization signal block (SSB);
receive scheduling information that schedules a downlink channel communication in one or more symbols that overlap with the SSB;
determine whether to decode the SSB, the downlink channel communication, or both the SSB and the downlink channel communication based at least in part on at least one of:
a capability of the UE,
a determination of whether a first beam that carries the SSB and a second beam that carries the downlink channel communication are quasi co-located,
an indication received from a base station, or
a first priority level of the SSB and a second priority level of the downlink channel communication; and
process one or more signals received in the one or more symbols based at least in part on the determination.

25. The UE of claim 24, wherein the UE is configured to send a negative acknowledgement (NACK) corresponding to the downlink channel communication based at least in part on a determination that the downlink channel communication is not to be decoded.

26. The UE of claim 24, wherein the one or more processors, when processing the one or more signals, are configured to one of:
decode both the SSB and the downlink channel communication in the one or more symbols,
decode only the SSB and not the downlink channel communication in the one or more symbols, or
decode only the downlink channel communication and not the SSB in the one or more symbols.

27. The UE of claim 24, wherein the one or more symbols of the downlink channel communication overlap with one or more symbols of the SSB in a time domain.

28. A base station for wireless communication, comprising:
memory; and
one or more processors operatively coupled to the memory, the memory and the one or more processors configured to:
transmit an instruction to a user equipment (UE) to measure a synchronization signal block (SSB) outside of an SSB measurement timing configuration (SMTC) window;
determine whether to transmit a downlink channel communication in one or more symbols that overlap with the SSB based at least in part on at least one of:
a capability of the UE, or
whether a first beam that is to carry the SSB and a second beam that is to carry the downlink channel communication are quasi co-located; and
transmit one or more signals in the one or more symbols based at least in part on the determination.

29. The base station of claim 28, wherein the base station, when transmitting the one or more signals, is configured to: transmit both the SSB and the downlink channel communication in the one or more symbols, or transmit only the SSB and not the downlink channel communication in the one or more symbols.

30. The base station of claim 28, wherein the one or more processors, when transmitting the one or more signals, are configured to:
transmit only the SSB and not the downlink channel communication in the one or more symbols.

* * * * *